US011463128B2

(12) United States Patent
Nii et al.

(10) Patent No.: US 11,463,128 B2
(45) Date of Patent: Oct. 4, 2022

(54) INFORMATION PROCESSING DEVICE

(71) Applicant: VIVITA JAPAN, INC., Fukuoka (JP)

(72) Inventors: Hideaki Nii, Fukuoka (JP); Shozaburo Shimada, Fukuoka (JP); Kazutoshi Kashimoto, Fukuoka (JP); Vijay Siddharth Pillai, Fukuoka (JP); Shintaro Itamoto, Fukuoka (JP)

(73) Assignee: VIVIWARE JAPAN, INC., Fukuoka (JP)

(*) Notice: Subject to any disclaimer, the term of this patent is extended or adjusted under 35 U.S.C. 154(b) by 338 days.

(21) Appl. No.: 16/638,617

(22) PCT Filed: Aug. 13, 2018

(86) PCT No.: PCT/JP2018/030224
§ 371 (c)(1),
(2) Date: Apr. 7, 2020

(87) PCT Pub. No.: WO2019/035448
PCT Pub. Date: Feb. 21, 2019

(65) Prior Publication Data
US 2021/0152214 A1 May 20, 2021

(30) Foreign Application Priority Data

Aug. 15, 2017 (JP) .............................. JP2017-156827

(51) Int. Cl.
*H04B 3/54* (2006.01)
*H04W 4/80* (2018.01)
(Continued)

(52) U.S. Cl.
CPC ......... *H04B 3/548* (2013.01); *H04N 1/00307* (2013.01); *H04Q 9/02* (2013.01); *H04W 4/80* (2018.02); *H04B 2203/547* (2013.01)

(58) Field of Classification Search
None
See application file for complete search history.

(56) References Cited

U.S. PATENT DOCUMENTS

| 5,727,025 A | 3/1998 | Maryanka |
| 2006/0077046 A1* | 4/2006 | Endo ........................ H04B 3/54 307/1 |

(Continued)

FOREIGN PATENT DOCUMENTS

| CN | 101896239 A | 11/2010 |
| CN | 102664034 A | 9/2012 |

(Continued)

OTHER PUBLICATIONS

EPO Extended European Search Report for corresponding EP Application No. 18846379.8, dated Sep. 24, 2020.

(Continued)

*Primary Examiner* — Jared Fureman
*Assistant Examiner* — Joel Barnett
(74) *Attorney, Agent, or Firm* — Cantor Colburn LLP

(57) ABSTRACT

An information processing device to enable a user to create a program with visual operations, and to enable the stable implementation of many functions with a small number of devices. In a basic core, a pairing unit executes pairing with a user terminal that executes control for causing functional modules, to exhibit prescribed functions. A transmission information generation unit generates transmission information including: prescribed information to be used by the functional modules, to exhibit the prescribed functions or while exhibiting the prescribed functions on the basis of the control by the user terminal; and information indicating a transmission destination, which is one of the functional modules. A connection unit executes control to superimpose the transmission information on a signal for supplying (Continued)

power to the functional modules in the form of electric current and to transmit the signal to the functional modules.

4 Claims, 11 Drawing Sheets

(51) Int. Cl.
*H04N 1/00* (2006.01)
*H04Q 9/02* (2006.01)

(56) References Cited

U.S. PATENT DOCUMENTS

| | | | |
|---|---|---|---|
| 2007/0210898 A1* | 9/2007 | Berglund | G05B 19/042 340/286.01 |
| 2010/0026086 A1 | 2/2010 | Siegel et al. | |
| 2010/0237695 A1 | 9/2010 | Covaro et al. | |
| 2010/0311300 A1* | 12/2010 | Hansen | A63H 33/042 446/91 |
| 2014/0239721 A1* | 8/2014 | Sgarroni | H02J 3/00 307/38 |
| 2016/0120010 A1* | 4/2016 | Reed | H05B 47/18 315/297 |
| 2016/0129358 A1 | 5/2016 | Eversdoll et al. | |
| 2016/0310861 A1 | 10/2016 | Hirata et al. | |
| 2017/0004730 A1 | 1/2017 | Kim | |
| 2019/0022539 A1 | 1/2019 | Kamada et al. | |

FOREIGN PATENT DOCUMENTS

| | | |
|---|---|---|
| JP | H10108985 A | 4/1998 |
| JP | 2003236261 A | 8/2003 |
| JP | 2010062766 A | 3/2010 |
| JP | 2001228963 A | 8/2010 |
| JP | 2015123231 A | 7/2015 |
| JP | 2017517030 A | 6/2017 |
| JP | 2017121283 A | 7/2017 |
| KR | 101520785 B1 | 5/2015 |

OTHER PUBLICATIONS

CNIPA The Second Office Action for corresponding CN Patent Application No. 201880053040.9; dated Aug. 16, 2021.
Oin Jian et al., "Android Programming Paradigm", Beijing Aeronautics and Astronautics University Press, Mar. 2013; pp. 423-424 *As the English trans, is not available, please see Chinese Office Action English translation for concise explanation.
International Search Report for Internatonal Application No. PCT/JP2018/030224, dated Oct. 2, 2018.
CNIPA Office Action for corresponding CN Application No. 201880053040.9, dated Feb. 1, 2021.

* cited by examiner

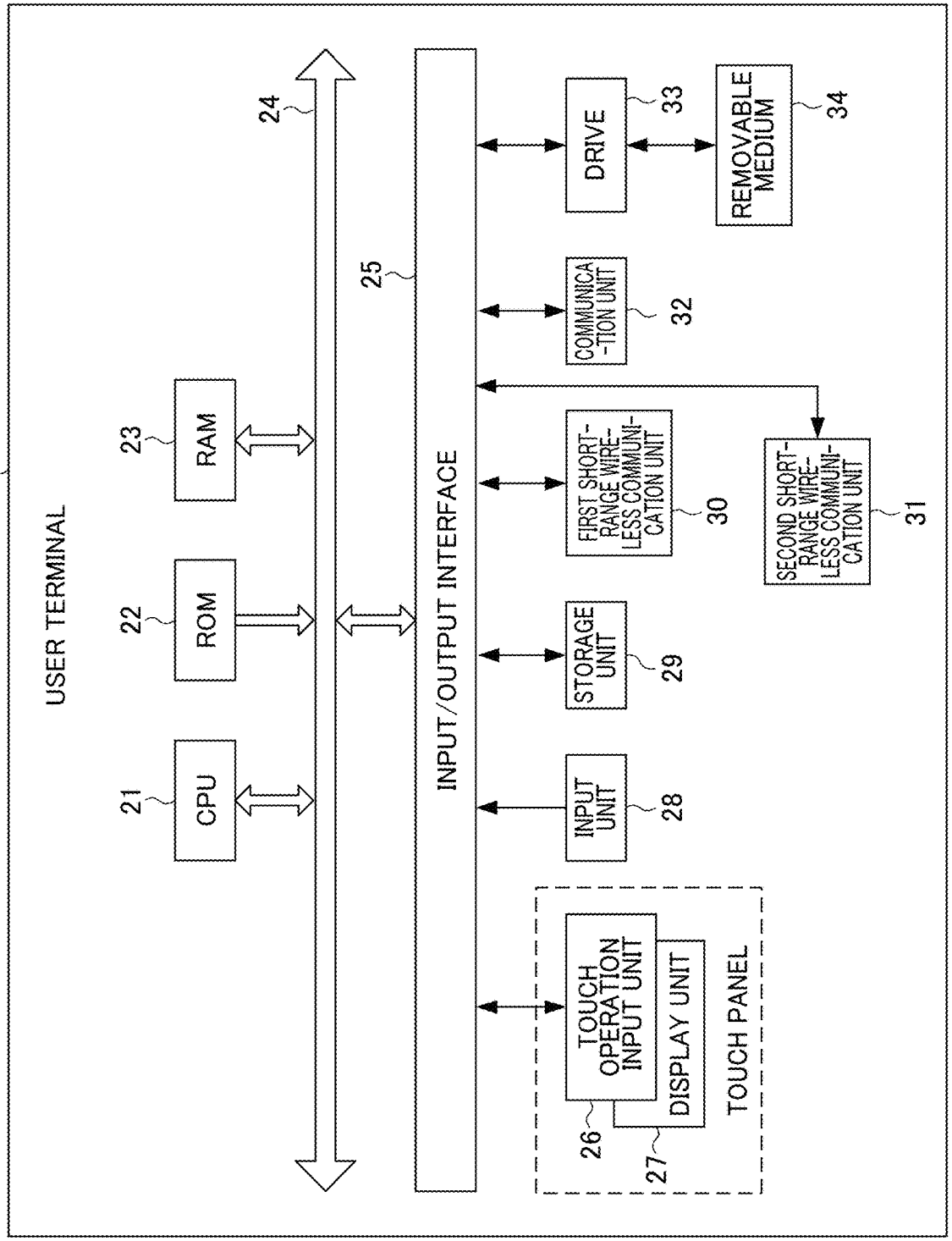

INFORMATION PROCESSING DEVICE

CROSS REFERENCE TO RELATED APPLICATIONS

This is the U.S. national stage of application No. PCT/JP2018/030224, filed Aug. 13, 2018. Priority under 35 U.S.C. § 119(a) and 35 U.S.C. § 365(b) is claimed from Japanese Application No. 2017-156827 filed Aug. 15, 2017, the disclosure of which is also incorporated herein by reference.

TECHNICAL FIELD

The present invention relates to an information processing device.

BACKGROUND ART

In the related art, assembly-type toys for the purpose of educating children have been widely provided, and many related technologies have been proposed (for example, refer to Patent Document 1). For example, according to the technology described in Patent Document 1, assembly blocks capable of constructing assembly-type toys by simple wiring and programming have been provided. According to the technology described in Patent Document 1, even a young user can construct assembly-type toys without executing complicated tasks and operations.

Patent Document 1: Japanese Unexamined Patent Application, Publication No. H10-108985

DISCLOSURE OF THE INVENTION

Problems to be Solved by the Invention

However, in the technology of Patent Document 1 described above, each of the assembly blocks is simply controlled by an existing program, and thus, there is a limit in the degree of freedom of operation and control of the assembly-type toy. That is, for example, only in the technology of Patent Document 1 described above, a process of creating a program by combining functions of the respective assembly blocks cannot be executed. In other words, only in the technology of Patent Document 1 described above, it was necessary to separately create complicated programs in order to execute an advanced process as combining the functions of the respective assembly blocks. In addition, in each of assembly blocks in the related art, power lines and communication lines were separately wired. In this method, in the case of collecting a large number of wirings into a single cable or the like, the cables are likely to be thick, and thus, routing of the wirings becomes poor. In addition, there is a restriction that a connection connector is also required. In addition, in each of the assembly blocks in the related art, a voltage-type communication system has been employed. In this method, in the case of stabilizing and communicating over a long distance, the circuit is likely to be complicated, and the cost and the size of the board are enlarged. That is, in each of the assembly blocks in the related art, it was difficult to stabilize data communication with a simple configuration.

Means for Solving the Problems

The present invention has been made in view of such a situation, and an object of the present invention is to cause a user to more easily create a complicated program with visual operations. In addition, an object of the present invention is to implement a large number of functions with a small number of devices. In addition, according to the present invention, it is possible to implement a large number of functions with a small number of devices. In addition, according to the present invention, it is possible to stabilize data communication with a simple configuration.

In order to achieve the above object, according to one aspect of the present invention, there is provided an information processing device that executes information communication and power supply to one or more other information processing devices each exhibiting a prescribed function, the information processing device including:
a pairing execution means for executing pairing with a control device that executes control for causing the other information processing device to exhibit the prescribed function by short-range wireless communication of a predetermined method;
a transmission information generation means for generating transmission information including prescribed information to be used by the other information processing device to exhibit or while exhibiting the prescribed function on the basis of the control by the control device and information indicating a transmission destination among the one or more other information processing devices; and
a transmission control means for superimposing the transmission information on a signal for supplying power to the one or more other information processing devices in a form of electric current and executing control for transmitting the signal to the one or more other information processing devices.

The information processing method and program according to one aspect of the present invention are also provided as information processing method and program corresponding to an information processing device according to one aspect of the present invention.

Effects of the Invention

According to the present invention, it is possible to provide a technique capable of causing a user to more easily create a complicated program with visual operations. In addition, according to the present invention, it is possible to implement a large number of functions with a small number of devices. In addition, according to the present invention, since power line communication is introduced, it is possible to execute power supply and communication by using only two lines. In addition, according to the present invention, since current-type communication is introduced, it is possible to form a simple circuit that is invulnerable to noise. That is, according to the present invention, it is possible to stabilize data communication with a simple configuration.

BRIEF DESCRIPTION OF THE DRAWINGS

FIG. 2 is a block diagram illustrating an example of a hardware configuration of a user terminal according to an embodiment of the present invention.

PREFERRED MODE FOR CARRYING OUT THE INVENTION

Hereinafter, embodiments of the present invention will be described with reference to the drawings.

Figure 1A:
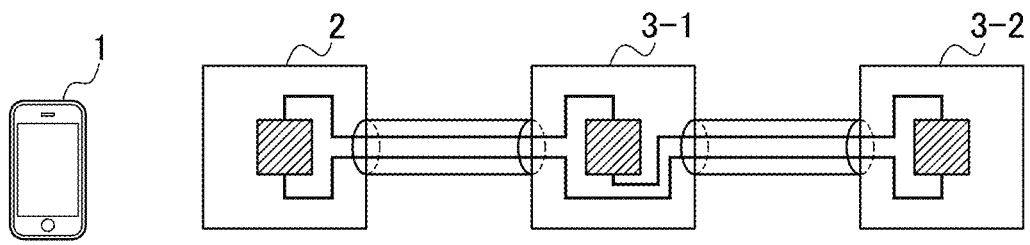
FIG. 1A is a block diagram illustrating a configuration (daisy chain type) of an information processing system according to an embodiment of the present invention.
Figure 1B:
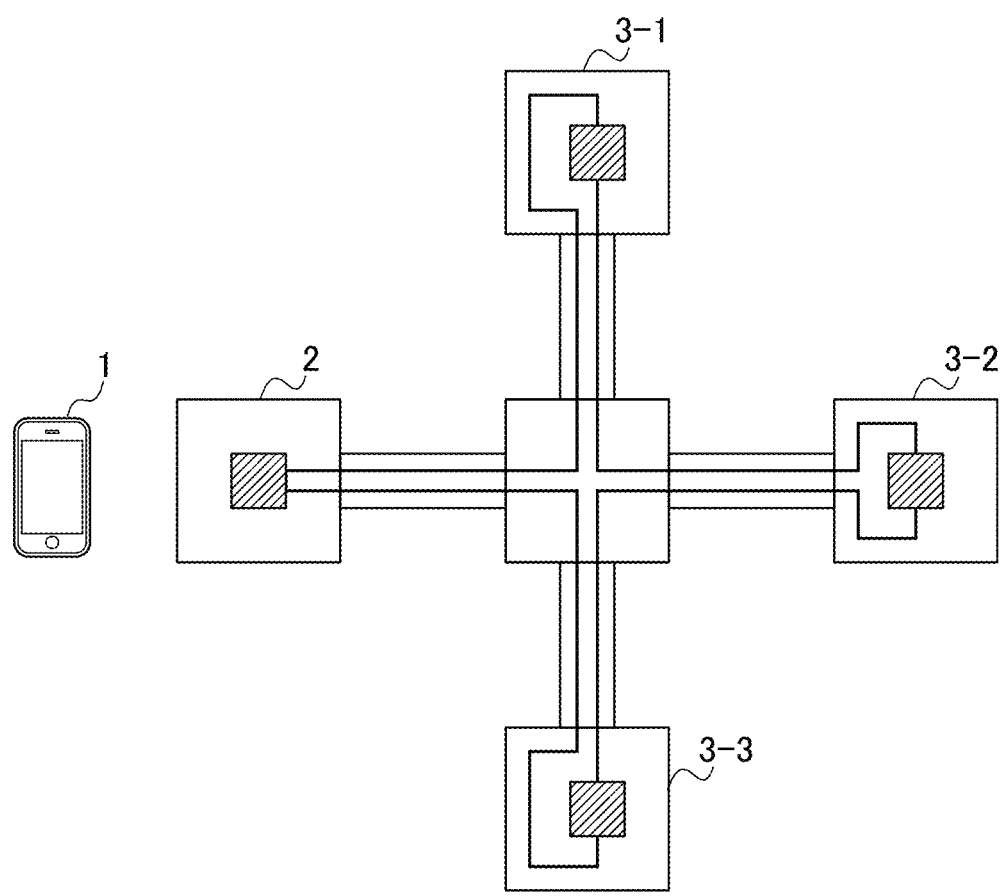
FIG. 1B is a block diagram illustrating a configuration (star type) of an information processing system according to an embodiment of the present invention.
Figure 1C:
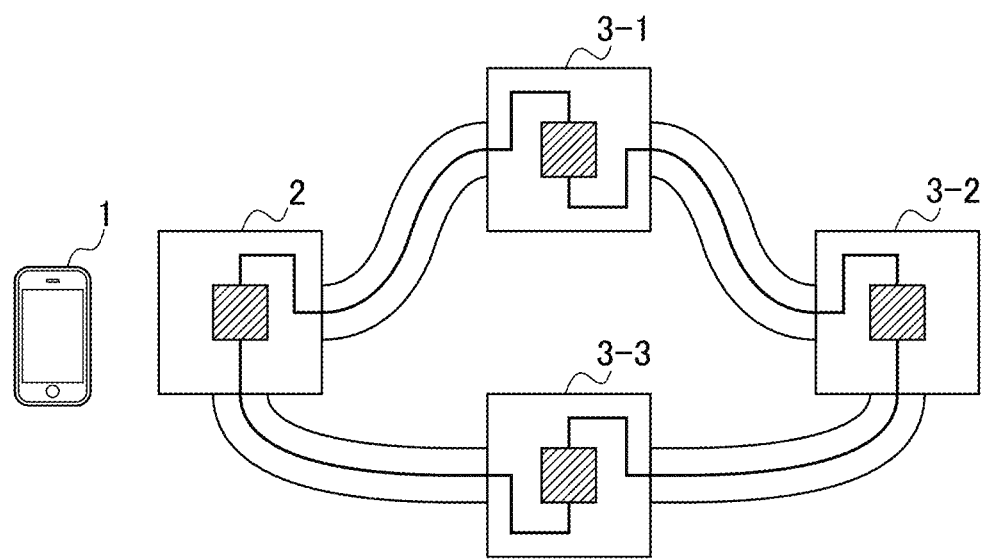
FIG. 1C is a block diagram illustrating a configuration (loop type) of an information processing system according to an embodiment of the present invention.

FIGS. 1A to FIG. 1C are block diagrams illustrating a configuration of an information processing system according to an embodiment of the present invention. The information processing system illustrated in FIG. 1A to FIG. 1C includes a user terminal 1 used by a user, a basic core 2, and a large number of functional modules 3-1 to 3-n (n is an arbitrary integer value of 1 or more). In addition, although only one user terminal 1 and one basic core 2 are illustrated in the example of FIG. 1A to FIG. 1C for the convenience of description, the present invention is not particularly limited thereto, and if pairing described later is available, an arbitrary number may be used. In addition, the number n of the functional modules 3-1 to 3-n connected to the basic core 2 is not particularly limited. As in the example of FIG. 1A, n=2; as in the examples of FIGS. 1B and 1C, n=3; and n may be any other integer value.

The user terminal 1 communicates with the basic core 2 in various methods, for example, near field communication (NFC, registered trademark), Bluetooth (registered trademark), or the like. In addition, hereinafter, in a case where it is not necessary to individually distinguish the functional modules 3-1 to 3-n, these functional modules are collectively referred to as a "functional module 3". FIGS. 1A to FIG. 1C illustrate a daisy chain type, a star type, and a loop type as three examples of a connection mode between the basic core 2 and the functional module 3. The daisy chain type illustrated in FIG. 1A is a so-called daisy chain connection mode in which the basic core 2 becomes one end, one functional module 3-1 is connected to the one end, the functional module 3-2 is further connected to the functional module 3-1, and another functional module 3 (not illustrated) is connected to the functional module 3-2. The star type illustrated in FIG. 1B is a connection mode in which the basic core 2 and two or more functional modules 3 (three functional modules 3-1 to 3-3 in this example of FIG. 1B) are connected in a star type. The loop type illustrated in FIG. 1C is a closed loop connection mode in which the basic core 2 and one or more functional modules 3 form a loop in a predetermined order (in this example of FIG. 1C, the order of the basic core 2 and the functional modules 3-1 to 3-3) to be connected. In the daisy chain type and the star type, the wiring does not form a closed loop in appearance, but the wiring is turned back in the basic core 2 or the functional module 3 located at the end, so that the wiring electrically becomes closed loop wiring. The connection mode is basically the above-mentioned connection modes, but if a configuration that electrically forms a closed loop wiring is employed, an arbitrary connection mode can be employed by combining the above-mentioned connection modes or the like.

Herein, the basic core 2 and the functional module 3 used in this embodiment will be described in brief. The basic core 2 is a hardware device used by being connected to the one or more functional modules 3 and executes pairing with the user terminal 1 through short-range wireless communication (for example, communication conforming to the NFC (registered trademark) standard).

The user terminal 1 recognizes a basic core 2-K and L (L is an arbitrary integer value) functional modules 3-K1 to 3-KL coneected to the basic core 2-K by executing pairing with a predetermined basic core 2-K (K is an arbitrary integer value of from 1 to m). In other words, the target of connection to the basic core 2-K may be serial connection of the L functional modules 3. The user terminal 1 can individually recognize the L functional modules 3. The functional module 3 is a hardware device configured with, for example, various sensors such as a temperature sensor, operator tools such as push buttons, driver tools such as a motor, and the like.

Herein, the pairing between the user terminal 1 and the basic core 2-K described above will be described. In this embodiment, in creating a program that involves at least the operation of the functional module 3 connected to the basic core 2-K, it is necessary to execute pairing using the short-range wireless communication between the user terminal 1 and the basic core 2-K.

In short, the pairing denotes causing the user terminal 1 to recognize the type, connection status, and the like of the basic core 2-K and the functional modules 3 connected thereto by using the short-range wireless communication. In addition, although the details are described later, if the user terminal 1 recognizes the type, the connection status, and the like of the functional module 3, an H-part corresponding to the connected functional module 3 is displayed on a program creation screen.

FIG. 2 is a block diagram illustrating an example of the hardware configuration of the user terminal according to the embodiment of the present invention. The user terminal 1 is configured with a tablet terminal or the like.

The user terminal 1 includes a central processing unit (CPU) 21, a read only memory (ROM) 22, a random access memory (RAM) 23, a bus 24, an input/output interface 25, a touch operation input unit 26, and a display unit 27, an input unit 28, a storage unit 29, a first short-range wireless communication unit 30, a second short-range wireless communication unit 31, a communication unit 32, a drive 33, and a removable medium 34. The CPU 21 executes various processes according to a program recorded in the ROM 22 or a program loaded from the storage unit 29 to the RAM 23.

The RAM 23 also stores information necessary for the CPU 21 to execute various processes or the like as appropriate. The CPU 21, the ROM 22, and the RAM 23 are connected to each other via the bus 24.

The input/output interface 25 is also connected to the bus 24. The touch operation input unit 26, the display unit 27, the input unit 28, the storage unit 29, the first short-range wireless communication unit 30, the second short-range wireless communication unit 31, the communication unit 32, and the drive 33 are connected to the input/output interface 25.

The touch operation input unit 26 is configured with, for example, a position input sensor of an electrostatic capacitive type or a resistive film type (pressure-sensitive type) stacked on the display unit 27 and detects coordinates of a position where a touch operation is performed. The display unit 27 is configured with a display such as a liquid crystal display and displays various images such as images related to the program creation. As described above, in this embodiment, a touch panel is configured with the touch operation input unit 26 and the display unit 27.

The input unit 28 is configured with various types of hardware or the like such as buttons and inputs various types of information according to a user's instruction operation. The storage unit 29 is configured with a hard disk, a dynamic random access memory (DRAM), or the like and stores various types of information.

The first short-range wireless communication unit 30 executes, for example, control for executing short-range wireless communication in a method conforming to the NFC (registered trademark) standard. Specifically, for example, as described above, the user terminal 1 and the basic core 2 execute short-range wireless communication in a method conforming to the NFC (registered trademark) standard to execute pairing.

The second short-range wireless communication unit 31 executes, for example, control for executing short-range wireless communication in a method conforming to the Bluetooth (registered trademark) standard. Specifically, for example, a result (including a command and the like) of execution of the program created by the user terminal 1 is transmitted by short-range wireless communication in a method conforming to the Bluetooth (registered trademark) standard.

The communication unit 32 controls communication with another device via the Internet or the like independently of the first short-range wireless communication unit 30 and the second short-range wireless communication unit 31. The drive 33 is provided as needed. The drive 33 is appropriately equipped with the removable medium 34 configured with a magnetic disk, an optical disk, a magneto-optical disk, a semiconductor memory, or the like.

The program read from the removable medium 34 by the drive 33 is installed in the storage unit 29 as needed. In addition, similarly to the storage unit 29, the removable medium 34 can also store various types of information stored in the storage unit 29.

Figure 3:
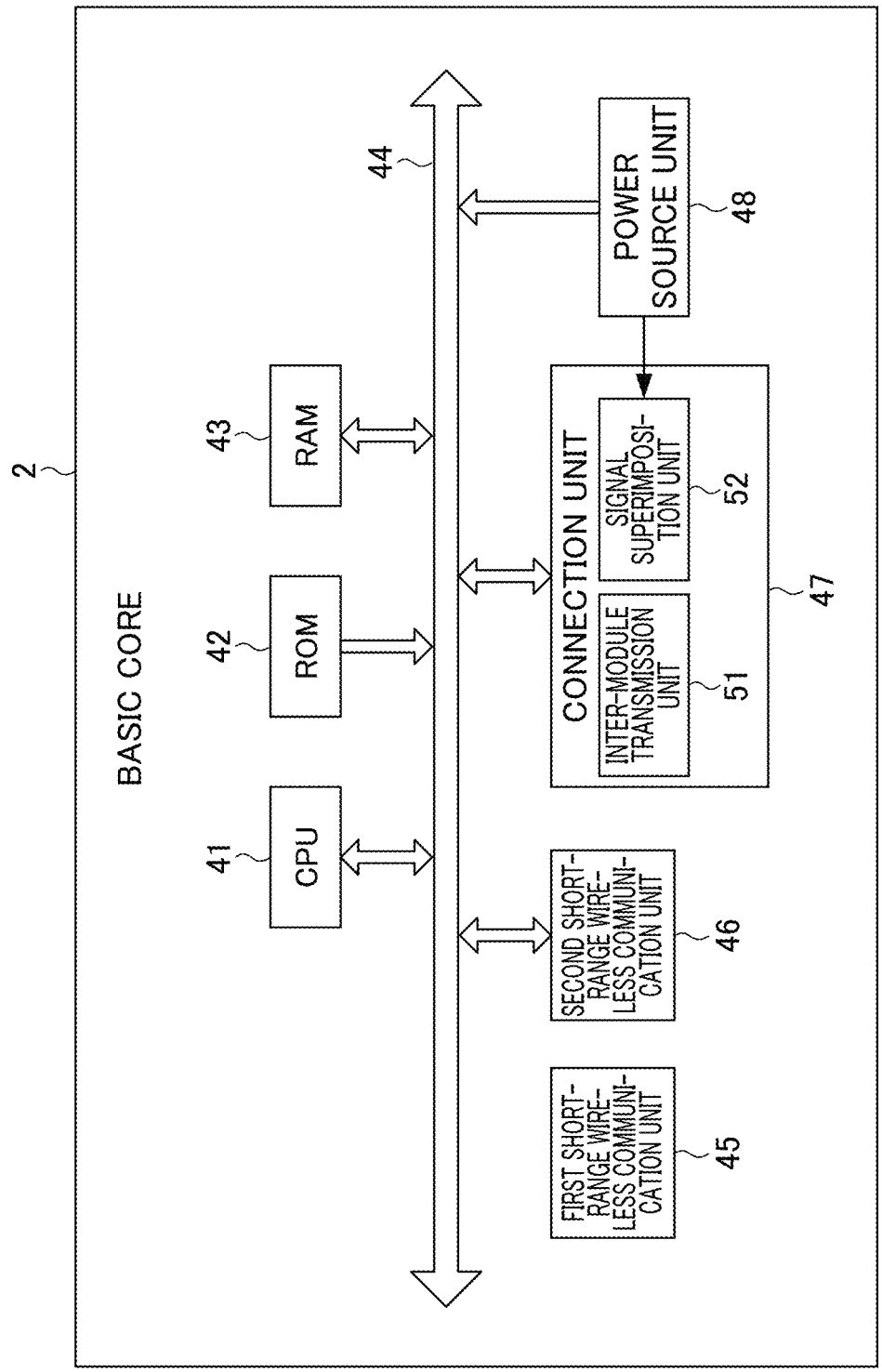
FIG. 3 is a block diagram illustrating an example of a hardware configuration of a basic core according to an embodiment of the present invention.

FIG. 3 is a block diagram illustrating an example of the hardware configuration of the basic core according to an embodiment of the present invention. The basic core 2 is configured with a predetermined hardware device and the like.

The basic core 2 includes a CPU 41, a ROM 42, a RAM 43, a bus 44, a first short-range wireless communication unit 45, a second short-range wireless communication unit 46, a connection unit 47, and a power source unit 48. Among the components of the basic core 2, the CPU 41, the ROM 42, the RAM 43, the bus 44, the first short-range wireless communication unit 45, and the second short-range wireless communication unit 46 are basically the same as the components of the user terminal 1, and thus, herein, the description thereof is omitted.

The connection unit 47 connects to another hardware device (for example, the functional module 3 in FIG. 1A to FIG. 1C). In addition, the connection unit 47 includes an inter-module transmission unit 51 and a signal superimposition unit 52.

The inter-module transmission unit 51 executes control to perform data communication on the power line, for example, by a method using a DC current signal of 4 to 20 mA or the like to transmit various types of information (hereinafter, appropriately referred to as "transmission information") while supplying power with a current to other hardware devices (for example, the functional module 3 illustrated in FIGS. 1A to FIG. 1C). That is, the signal superimposition unit 52 separably superimposes prescribed information to be supplied to another hardware device (for example, the functional module 3 in FIGS. 1A to FIG. 1C) on a current to be supplied from the power source unit 48 described later. The current signal on which the transmission information is superimposed is transmitted from the inter-module transmission unit 51 to the functional module 3.

The power source unit 48 is a stabilized DC power source and supplies power to the basic core 2 and also supplies power to the functional modules 3 through the inter-module transmission unit 51 as appropriate.

Figure 4:
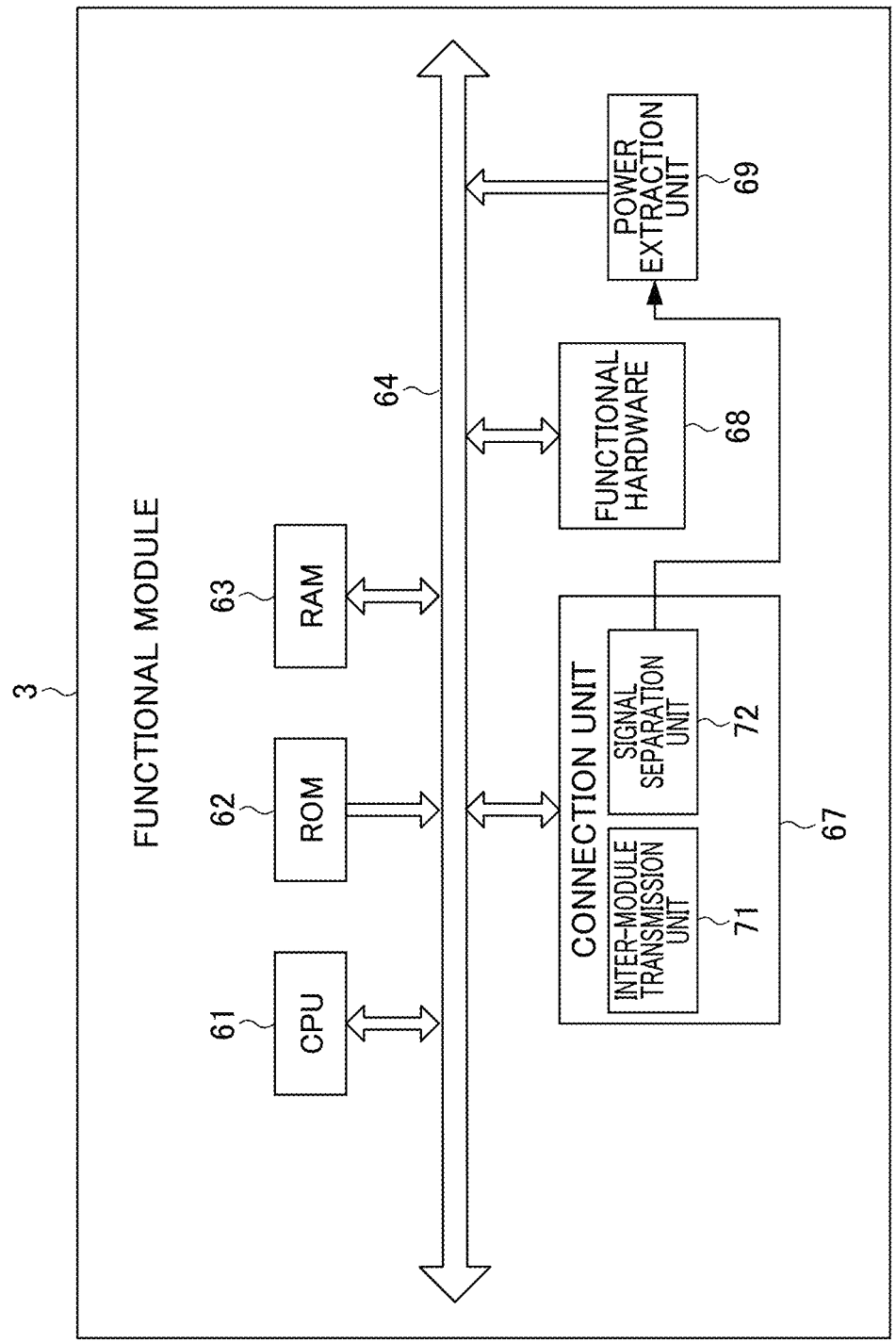
FIG. 4 is a block diagram illustrating an example of a hardware configuration of a functional module according to an embodiment of the present invention.

FIG. 4 is a block diagram illustrating an example of the hardware configuration of the functional module according to an embodiment of the present invention. The functional module 3 is configured with a predetermined hardware device or the like.

The functional module 3 includes a CPU 61, a ROM 62, a RAM 63, a bus 64, a connection unit 67, a functional hardware 68, and a power extraction unit 69. Among the components of the functional module 3, the CPU 61, the ROM 62, the RAM 63, and the bus 64 are basically the same as the components of the user terminal 1 or the basic core 2, and thus, herein, the description thereof is omitted.

The connection unit 67 connects to another hardware device (for example, the basic core 2 or another functional module 3 in FIGS. 1A to 1C). In addition, the connection unit 67 includes an inter-module transmission unit 71 and a signal separation unit 72.

The inter-module transmission unit 71 executes control to perform data communication on the power line, for example, by a method using a DC current signal of 4 to 20 mA or the like to receive the power with a current supplied from the first other hardware device (for example, the basic core 2 or the first other functional module 3) to supply the power to the power extraction unit 69 and to transmit the power to the second other hardware device (for example, the second other functional module 3). In a case where the transmission information (for example, a command or the like for the own functional hardware 68) addressed to the own device is superimposed on the current signal supplied from the first other hardware device (for example, the basic core 2 or the first other functional module 3), the signal separation unit 72 separates the transmission information and supplies the transmission information to the functional hardware 68 or the like.

The functional hardware 68 is, for example, a temperature sensor or a buzzer and is hardware or the like for each functional module to exhibit its unique function. The function is allowed to be exhibited on the basis of information such as a command supplied from the signal separation unit 72. That is, the program created by the user is reflected on the actual hardware by the functional hardware 68 appropriately exhibiting its function.

The power extraction unit 69 supplies the power obtained through the inter-module transmission unit 71 or the power supplied from an external power source (for example, a battery unit BU in FIG. 5) to the functional module 3. In addition, similarly to the basic core 2, the functional module 3 may also be provided with a first short-range wireless communication unit and a second short-range wireless communication unit.

Figure 5:
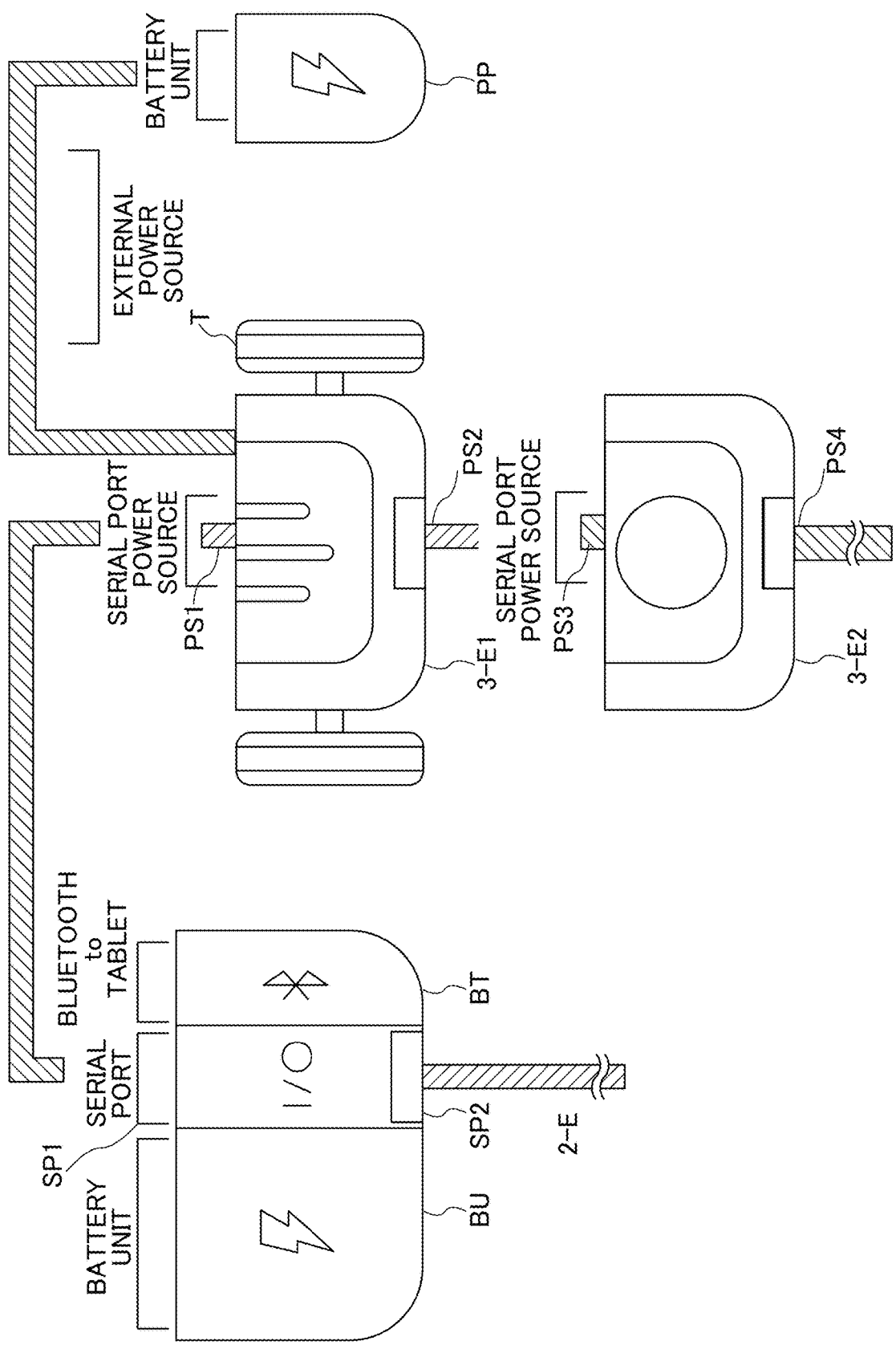
FIG. 5 is a diagram illustrating an example of a configuration in a state where a basic core and a functional module according to an embodiment of the present invention are connected.

Next, the connection mode of a basic core 2-E (E is an arbitrary integer value of from 1 to m), a functional module 3-E1, and a functional module 3-E2 (E1 and E2 are arbitrary integer values of 1 to n) will be described in detail with reference to FIG. 5. FIG. 5 is a diagram illustrating an example of a configuration in a state where the basic core and the functional module according to an embodiment of the present invention are connected.

FIG. 5 illustrates the basic core 2-E, the functional module 3-E1, the functional module 3-E2, and a battery unit PP. The basic core 2-E is provided with the battery unit BU (for example, the power source unit 48 in FIG. 6), serial ports SP1 and SP2, and a short-range wireless communication unit BT (for example, a second short-range wireless communication unit 46 in FIG. 6).

The battery unit BU is, for example, a stabilized DC power source and supplies power to the basic core 2-E, the functional module 3-E1, and the functional module 3-E2 with current. The serial ports SP1 and SP2 are connection ports (connection connectors) for connecting the basic core 2-E to other hardware or the like.

In the example of FIG. 5, the basic core 2-E is provided with the serial ports SP1 and SP2, and the functional module 3-E1 is provided with a serial port PS1. Then, the basic core 2-E and the functional module 3-E1 are connected through the two serial ports SP1 and PS1.

In addition, the functional module 3-E1 is provided with a serial port PS2, the functional module 3-E2 is provided with a serial port PS3, and the functional module 3-E1 and the functional module 3-E2 are connected to each other through the two serial ports PS2 and PS3. A plurality of modules may be connected to the serial port SP2 of the basic core 2-E in a loop shape through the functional module 3 located at the end connected in series from the serial port SP1 and the serial port thereof. The short-range wireless communication unit BT is equipped with an IC card or the like for executing the short-range wireless communication with other hardware or the like by a method according to a predetermined standard (for example, Bluetooth (registered trademark)).

In the example of FIG. 5, the user terminal 1 (not illustrated in FIG. 5) and the basic core 2-E provided with the short-range wireless communication unit BT execute the short-range wireless communication in a method according to Bluetooth (registered trademark). Specifically, for example, an execution result (command or the like) of the program created by the user terminal 1 is also transmitted to the basic core 2-E.

Moreover, the basic core 2-E acquires the execution result (command or the like) of the program transmitted from the user terminal 1, further, superimposes the result on the current signal (for power source) as the transmission information, and transmits the transmission information to the functional module 3 as a target of the command or the like among the functional modules 3-E1 and 3-E2. In addition, the functional module 3-E1 includes a tire T (for example, a functional hardware 68*a* in FIG. 4), and the functional module 3-E2 includes a buzzer (for example, a functional hardware 68*b* in FIG. 4).

Then, as described above, the functional modules 3-E1 and 3-E2 acquire only the execution result (command or the like) of the program for the own device among the transmission information transmitted from the basic core 2-E. The functional module 3-E1 in the example of FIG. 5 drives the tire T according to a command or the like for driving the tire among the execution results (commands or the like) of the program created by the user terminal 1. The functional module 3-E2 sounds the buzzer according to a command or the like for sounding the buzzer among the execution results (commands or the like) of the program created by the user terminal 1.

Herein, in the example of FIG. 5, the battery unit PP is connected to the functional module 3-E1. This battery unit PP supplies power to the functional module 3-E1 as an external power source and also supplies power to the functional module 3-E2 connected to the functional module 3-E1 and the like. In addition, as described above, if the necessary power can be supplied from the power source unit 48 (FIG. 3) and the like of the basic core 2 to the functional module 3-E1 and the like, the battery unit PP is not an essential component.

It is possible to execute a program creation process by the cooperative operation of various types of hardware and various types of software of the user terminal 1, the basic core 2, and the functional module 3. Herein, the program creation process is a process for creating a program for causing one or more functional modules 3 connected to the basic core 2 to function.

Figure 6:
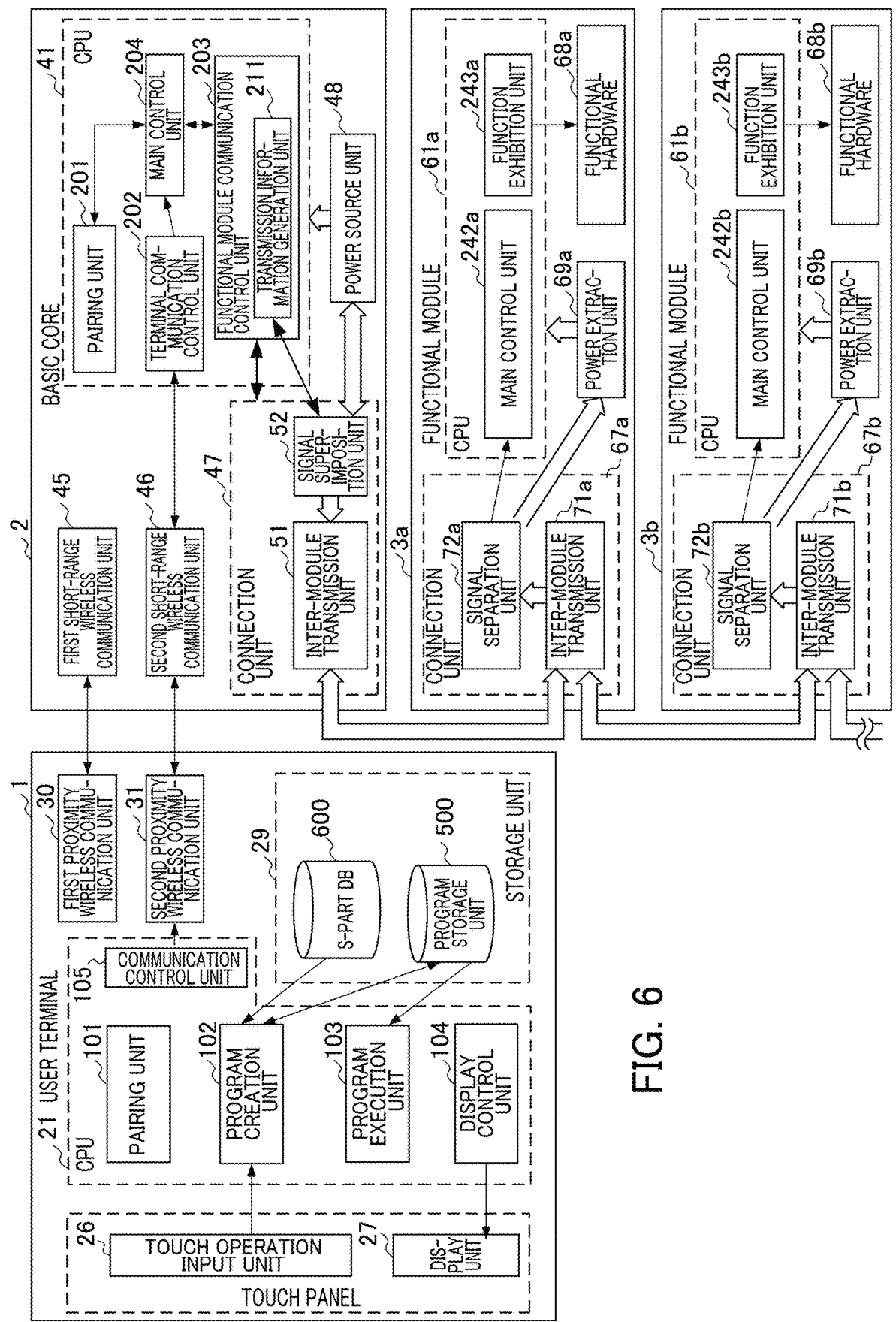
FIG. 6 is a functional block diagram illustrating a functional configuration example of the user terminal of FIG. 2, the basic core of FIG. 3, and the functional module of FIG. 4.

In order to realize the program creation process, the user terminal 1, the basic core 2, and the functional module 3 have a functional configuration as illustrated in FIG. 6. FIG. 6 is a functional block diagram illustrating a functional configuration example of the user terminal of FIG. 2, the basic core of FIG. 3, and the functional module of FIG. 4.

As illustrated in FIG. 6, in the CPU 21 of the user terminal 1, a pairing unit 101, a program creation unit 102, a program execution unit 103, a display control unit 104, and a communication control unit 105 function. In addition, in one area of the storage unit 29 of the user terminal 1, a program storage unit 500 that stores a program created by the program creation unit 102 and a soft ware parts data base (S-part DB) 600 that stores various types of S-parts are provided.

In addition, in the CPU 41 of the basic core 2, a pairing unit 201, a terminal communication control unit 202, a functional module communication control unit 203, and a main control unit 204 function. In addition, in a CPU 61*a* of a functional module 3*a*, a main control unit 242*a* and a function exhibition unit 243*a* function.

In addition, in a CPU 61*b* of a functional module 3*b*, a main control unit 242*b* and a function exhibition unit 243*b* function. Although the functional module 3 may be further provided, since it has the same configuration, the illustration is omitted.

The pairing unit 101 of the user terminal 1 executes pairing between the user terminal 1 and the basic core 2 through the first short-range wireless communication unit 30. In addition, in this embodiment, the pairing is executed by short-range wireless communication conforming to NFC (registered trademark), but this is merely an example, the pairing may be executed by communication of an arbitrary method. The pairing unit 101 checks the type and connection status of the basic core 2 paired with the user terminal 1 and the functional module 3 connected thereto.

In addition, the type and connection status of the functional module 3 checked by the pairing unit 101 are displayed on the program creation screen through the display control unit 104. The program creation unit 102 receives a user's touch operation and actually creates the program.

The program creation unit 102 displays the H-part corresponding to the type of the functional module 3 connected to the basic core 2 paired by the pairing unit 101 on the program creation screen through the display control unit 104. The program creation unit 102 appropriately extracts S-part from the S-part DB 600 and displays the S-part on the program creation screen through the display control unit 104.

The program creation unit 102 combines various types of the H-parts and various types of the S-parts in response to the user's touch operation. In the finally created program, contents of the program specified for the various types of the H-parts and various types of the S-parts combined in this manner are continuously executed.

The program creation unit 102 determines the contents of the program created by the user and stores the created program in the program storage unit 500. The program execution unit 103 extracts the program that the user desires to execute among the programs stored in the program storage unit 500 and executes the program.

The program execution unit 103 executes a program for the purpose of operating the basic core 2 and the functional module 3 with a program created by the user. That is, the program execution unit 103 transmits the execution result (command or the like) of the created program to the basic core 2 and the functional module 3 and causes the functional module 3 to exhibit the function.

In addition, the execution result of the program is not only displayed on the display unit 27 through the display control unit 104 but also transmitted to the basic core 2 by the communication control unit 105 as described later. The display control unit 104 executes control for displaying the various types of information or the like described above on the display unit 27.

The communication control unit 105 executes control or the like for transmitting the execution result of the program executed by the program execution unit 103 to the basic core 2 through the second short-range wireless communication unit 31. In addition, as described above, in this embodiment, the second short-range wireless communication unit 31 executes short-range wireless communication in a method conforming to the Bluetooth (registered trademark) standard.

The pairing unit 201 of the basic core 2 executes pairing with the user terminal 1 that executes control of causing the functional module 3 to exhibit a prescribed function by short-range wireless communication of a predetermined method through the first short-range wireless communication unit 45. Herein, the first short-range wireless communication unit 45 is independent of the system in the basic core 2. Therefore, the connection information (for example, the MAC address) of the second short-range wireless communication unit 46 is written in the first short-range wireless communication unit 45 in advance, and the pairing unit 201 reads the MAC address and implements pairing with the user terminal 1 according to Bluetooth (registered trademark).

For example, the terminal communication control unit 202 executes control and the like for acquiring the execution result of the program transmitted from the user terminal 1 through the second short-range wireless communication unit 46.

Herein, at the time of execution of the program, the functional module 3 that exhibits a function by the program needs to be connected to a predetermined basic core 2. That is, at least at the time of execution of the program, the basic core 2 and the functional module 3 are connected by the connection unit 47 and the connection unit 67.

Herein, the reason why at least the program is executed is that the connection between the basic core 2 and the functional module 3 can be executed independently of the pairing between the basic core 2 and the user terminal 1. That is, the connection between the basic core 2 and the functional module 3 may be executed before the pairing, but the connection between the basic core 2 and the functional module 3 may be executed after the pairing.

In the latter case, the unique ID of its own functional module is transmitted from the functional module 3 to the user terminal 1, and thus, the user terminal 1 can recognize what the functional module 3 is (what function the functional module 3 exhibits). In addition, the functional module 3 can be removed from the basic core 2 after the pairing.

At that time, the basic core 2 notifies the user terminal 1 that the functional module 3 has been removed. The user terminal 1 causes the display unit 27 (the user display screen or the like illustrated in FIGS. 8A to 8C to be described later) to display the message that the functional module 3 has been removed. More precisely, in this embodiment, in a case where the prescribed functional module 3 has been removed from the basic core 2, the user terminal 1 displays an icon indicating the H-part corresponding to the prescribed functional module 3 as a non-display state on the display unit 27.

In this manner, hot swap of the functional module 3 after the pairing is realized. That is, once the pairing is executed, the user only needs to insert and remove the functional module 3 with respect to the basic core 2.

The state of the removal and insertion is also followed by the display unit 27 on the user terminal 1. Anyway, in a case where the basic core 2 and the functional module 3 are connected to each other, the functional module communication control unit 203 of the basic core 2 executes control of communicating with the functional module 3 connected through the connection unit 47. For example, the functional module communication control unit 203 transmits an operation instruction or the like output by the main control unit 204 described later to the functional module 3. That is, the functional module communication control unit 203 executes control of superimposing the transmission information on the current signal for supplying the power to one or more functional modules 3 in a form of electric current and transmitting the current signal to the one or more functional modules 3. Herein, the functional module communication control unit 203 is provided with a transmission information generation unit 211. The transmission information generation unit 211 generates transmission information including prescribed information to be used by the functional module 3 to exhibit or while exhibiting the prescribed function on the basis of the control by the user terminal 1 and information indicating a transmission destination among the one or more functional modules 3.

The main control unit 204 executes main control of various types of processes executed by the basic core 2. For example, the main control unit 204 outputs an operation instruction or the like for causing the functional module 3 to exhibit the function on the basis of the execution result of the program acquired by the terminal communication control unit 202.

Next, each functional component of the functional module 3a will be described. Since the functional module 3b also has the same configuration as the functional module 3a, redundant description will be omitted unless otherwise specified.

The main control unit 242a of the functional module 3 executes main control of various types of the processes executed by the functional module 3a. For example, the main control unit 242a acquires the operation instruction (command or the like) transmitted as the transmission information from the basic core 2 through a connection unit 67a.

The function exhibition unit 243a executes control of causing the functional hardware 68a to execute on the basis of the operation instruction acquired by the main control unit 242a. That is, the function exhibition unit 243a causes the functional hardware 68a to execute on the basis of the operation instruction acquired by the main control unit 242a to exhibit the function of the functional module 3a.

In addition, FIG. 6 illustrates only a state in which a power extraction unit 69a supplies the power acquired through an inter-module transmission unit 71a to the functional module 3a, but as described above, a power supplied from an external power source (for example, the battery unit BU in FIG. 5) may be supplied to the functional module 3a.

Figure 7:
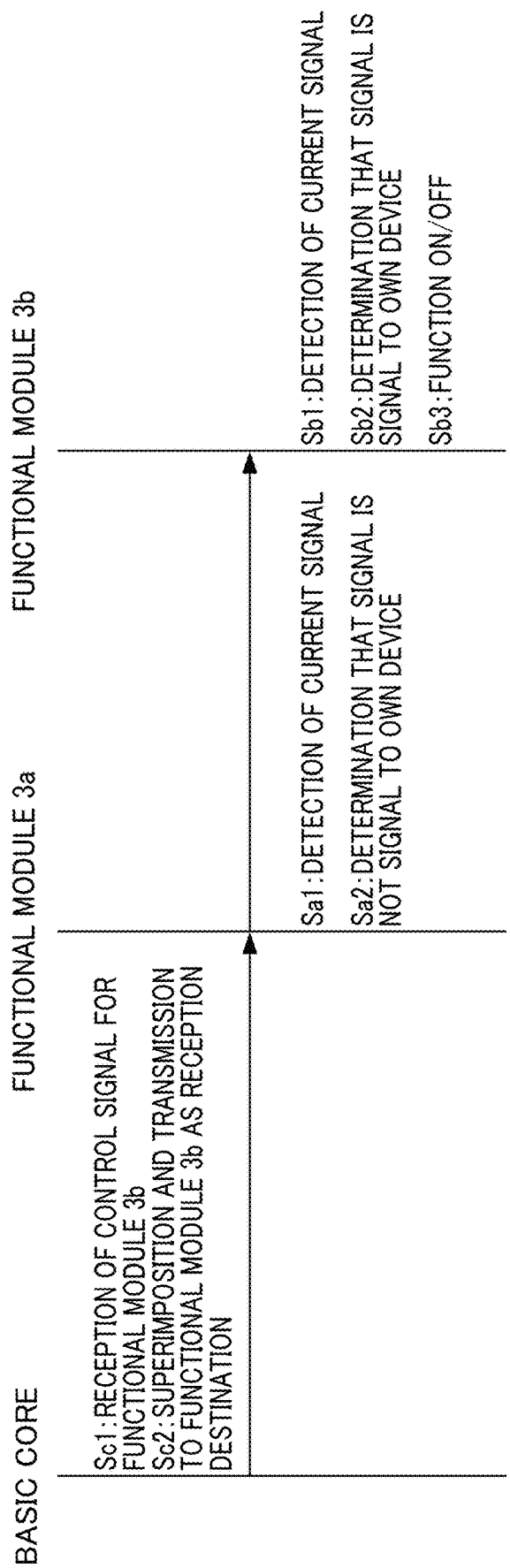
FIG. 7 is an arrow chart describing a flow of an inter-module communication process according to the present invention.

Next, an inter-module communication process executed by the information processing system of FIGS. 1A to 1C will be described with reference to FIG. 7. FIG. 7 is an arrow chart describing a flow of the inter-module communication process.

In step Sc1, the main control unit 204 (FIG. 6) of the basic core 2 receives control command information on functional control of the functional module 3b from the user terminal 1 through the terminal communication control unit 202. In step Sc2, the transmission information generation unit 211 (FIG. 6) of the functional module communication control unit 203 of the basic core 2 generates the transmission information by combining control information received in step Sc1 and information indicating that the reception destination is the functional module 3b. The signal superimposition unit 52 superimposes the transmission information on the current for supplying power from the power source unit 48. The inter-module transmission unit 51 transmits the signal of the current on which the transmission information is superimposed.

In step Sa1, the inter-module transmission unit 71a (FIG. 6) of the connection unit 67a of the functional module 3a detects the signal of the current transmitted from the basic core 2. In step Sa2, a signal separation unit 72a (FIG. 6) of the functional module 3a analyzes the detected signal of the current and determines that the signal is not a control signal (transmission information) to the own device because the reception destination is not the own device. In this case, the power extraction unit 69a acquires power through the inter-module transmission unit 71a and supplies the power to the functional module 3a.

In step Sb1, an inter-module transmission unit 71b (FIG. 6) of a connection unit 67b of the functional module 3b detects the signal of the current transmitted from the basic core 2 through the functional module 3a. In step Sb2, a signal separation unit 72b (FIG. 6) of the functional module 3b analyzes the detected signal of the current and determines that the signal is a control signal (transmission information) to the own device because the reception destination includes the own device. Then, the signal separation unit 72b separates the control signal (transmission information) and supplies the signal to the functional hardware 68b and the like. In addition, a power extraction unit 69b acquires power through the inter-module transmission unit 71b and supplies the power to the functional module 3a.

In step Sb3, the main control unit 242b and the function exhibition unit 243b (FIG. 6) of the functional module 3b execute control for turning on/off the function of the functional hardware on the basis of the control signal.

Figure 8A:
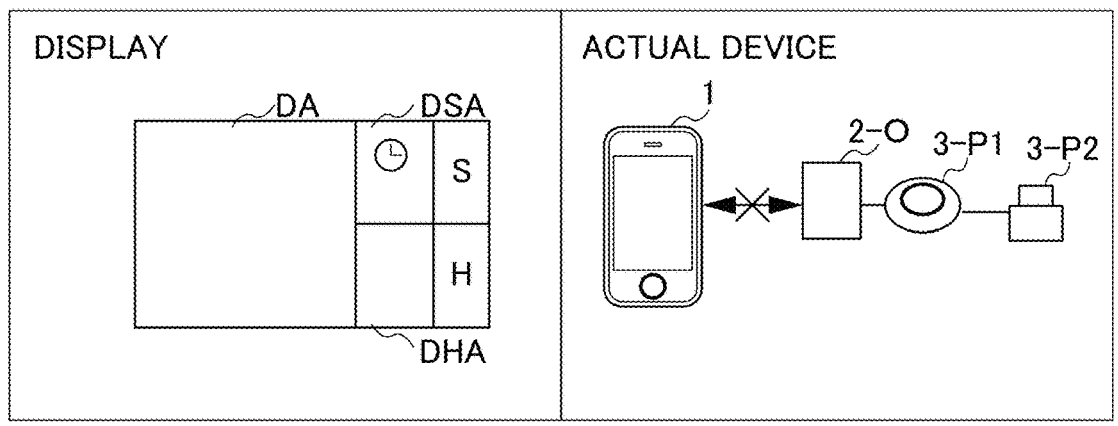
FIG. 8A is a diagram illustrating an example (no pairing) of a screen actually displayed to a user in a program creation process using an information processing system according to an embodiment of the present invention.
Figure 8B:
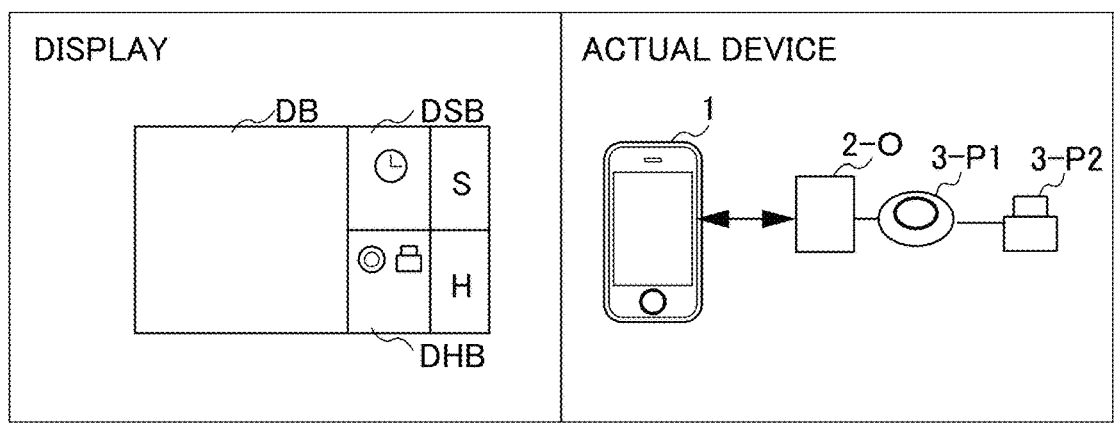
FIG. 8B is a diagram illustrating an example (with pairing) of a screen actually displayed to a user in a program creation process using an information processing system according to an embodiment of the present invention.
Figure 8C:
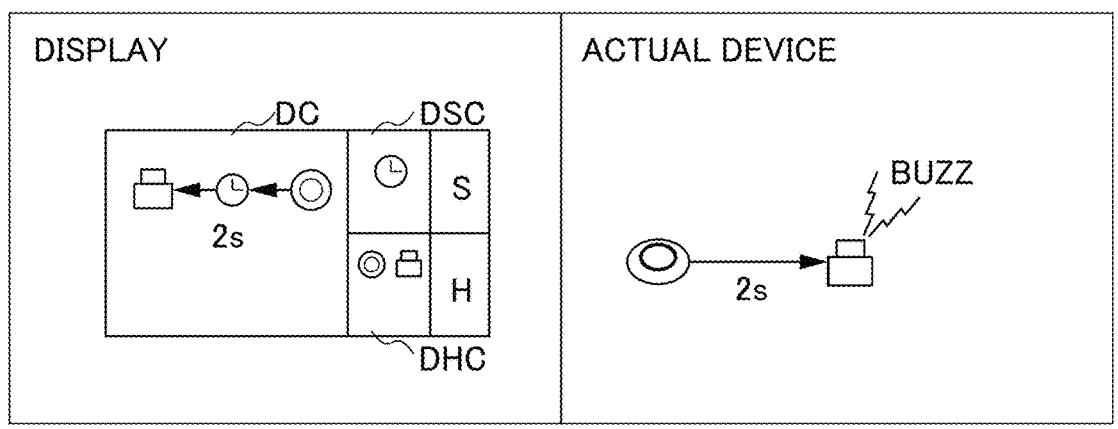
FIG. 8C is a diagram illustrating an example of a screen actually displayed to a user in a program creation process using an information processing system according to an embodiment of the present invention.

Next, the program creation screen displayed on the display unit 27 of the user terminal 1 will be described in detail with reference to FIGS. 8A to 8C. FIGS. 8A to 8C are diagrams illustrating examples of the screen actually displayed to the user in the program creation process executed by the user terminal 1 in FIG. 2.

In FIGS. 8A to FIG. 8C, a program creation screen (hereinafter, referred to as a "user display screen") displayed to the user is displayed on the left half, and a schematic diagram (hereinafter, referred to as a "hardware schematic diagram") of various types of hardware operating according to the actually created programs is displayed on the right half. First, FIG. 8A illustrates a situation where the user terminal 1 has not been paired with any of the basic cores 2.

That is, referring to the hardware schematic diagram of FIG. 8A, in the user terminal 1, a basic core 2-O (O is an arbitrary integer value of from 1 to m), a functional module 3-P1, and a functional module 3-P2 (P1 and P2 are arbitrary integer values) are not paired. In addition, the functional module 3-P1 can exhibit a lighting function. The functional module 3-P2 can exhibit a buzzer function.

In addition, referring to the user display screen of FIG. 8A, no icon is displayed in a program creation display area DA and an H-part display area DHA. In addition, an icon of a timer is displayed in an S-part display area DSA.

FIG. 8B illustrates a situation in which the user terminal 1 is paired with the basic core 2-O to which the functional module 3-P1 and the functional module 3-P2 are connected. In addition, referring to the user display screen of FIG. 8B, a light icon corresponding to the paired functional module 3-P1 and a buzzer icon corresponding to the functional module 3-P2 are displayed in an H-part display area DHB.

FIG. 8C illustrates a situation in which the program created by the user is executed. Referring to the user display screen of FIG. 8C, a light icon, a timer 2s, and a buzzer icon are displayed in order from the right in a program creation display area DC, and the respective icons are sequentially connected by arrows.

As described above, the user can create one program by combining the contents specified by the respective icons by freely combining various types of the H-parts and various types of the S-parts while visually recognizing the icons displayed on the user display screen and can execute the program. Referring to the hardware schematic diagram of FIG. 8C, it can be understood that, if the light (functional module 3-P1) is turned on as a result of the execution of the program illustrated on the user display screen of the same figure, the operation of the buzzer (functional module 3-P2) sounding is realized after two seconds.

Although one embodiment of the present invention has been described above, the present invention is not limited to the above-described embodiment, and modifications, improvements, and the like within a range where the object of the present invention can be achieved are included in the present invention. For example, in the embodiment illustrated in FIG. 8B, a light and a buzzer are employed as the functional module 3-P1 and the functional module 3-P2, but the function exhibited by the functional module 3 is not particularly limited to the above-described embodiment. In addition, for example, in the embodiment illustrated in FIG. 6, a battery capable of supplying a stabilized DC current is employed as the power source unit 48, but the supplied current is not limited to the DC current, an AC current may be supplied by employing various means such as an inverter.

Figure 9A:
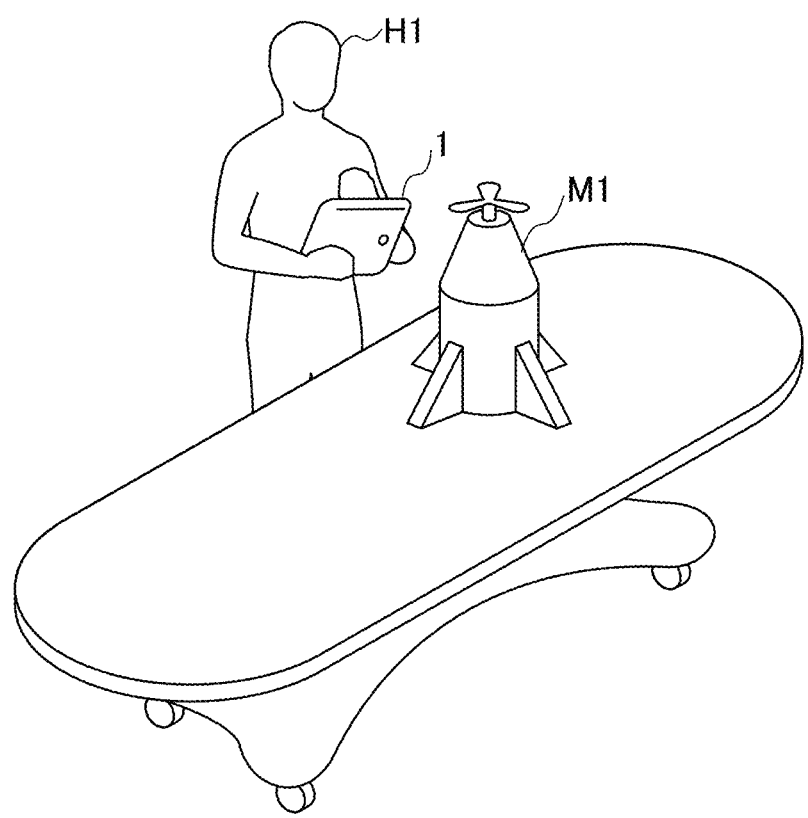
FIG. 9A is a diagram illustrating a specific example according to an embodiment of the present invention.
Figure 9B:
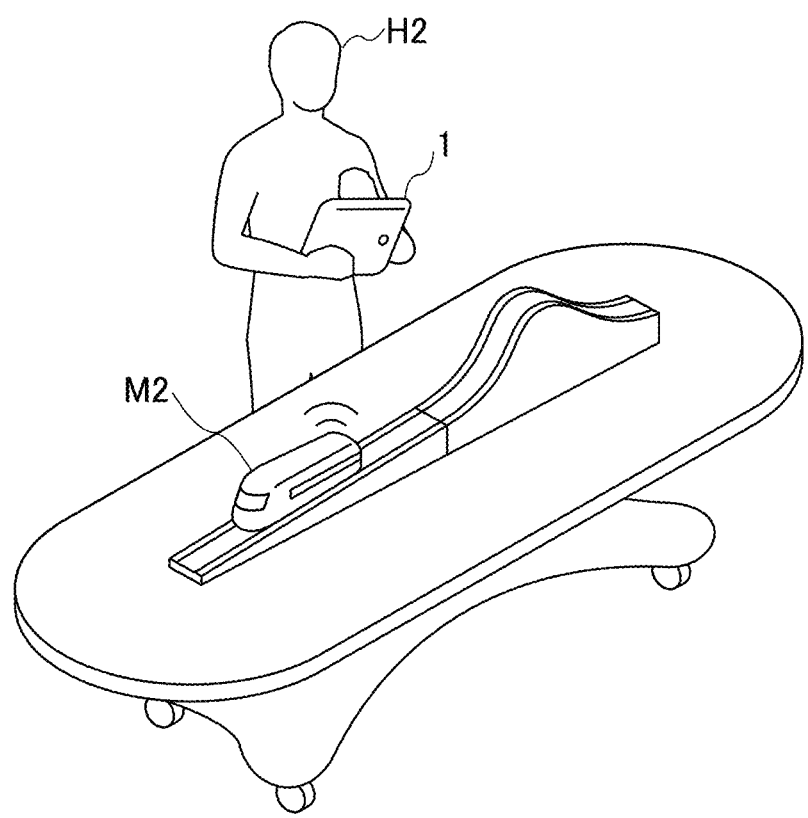
FIG. 9B is a diagram illustrating a specific example according to an embodiment of the present invention.

Hereinafter, other embodiments in which a method different from the above-described embodiment is employed will be described with reference to FIGS. 9A and FIG. 9B. FIGS. 9A and FIG. 9B are diagrams illustrating specific examples according to an embodiment of the present invention.

Referring to FIG. 9A, a rocket toy with a propeller is employed as a functional module M1. For example, in the example of FIG. 9A, if an execution button of the program is pressed by a predetermined user H1, the program in which a propeller is rotated after a countdown of 10 seconds is created and executed.

In addition, a basic core B1 connected to the functional module M1 and a functional module MC (for example, a speaker or the like) exhibiting a countdown function are not illustrated, but the basic core B1 and the functional module MC are stored, for example, inside the functional module M1.

In addition, referring to FIG. 9B, a train toy is employed as the functional module M1. For example, in the example of FIG. 9B, if an execution button of the program is pressed by a predetermined user H2, the program in which a train starts in response to a human voice or the like is created and executed.

In addition, in FIG. 9B, similarly to FIG. 9A, a basic core B2 connected to a functional module M2 and a functional module MA (for example, an audio sensor) exhibiting a function of checking sound are not illustrated, but the basic core B2 and the functional module MA are stored, for example, inside the functional module M2. The present invention can be implemented in such various forms, and in many embodiments, the present invention is extremely useful for creating a program to be used especially as an assembly-type toy for children's education.

Since the icons displayed on the program creation screen can be visually checked, even if the user is a child, it is possible to safely and easily create a program, and in addition, since the program can be operated by an actual device according to the program created by the user, it is possible for children to enjoy creation of the program without getting tired. In this manner, by causing the children to create the programs while enjoying, the children can get used to the program that is generally hard to touch.

In addition, if the basic core 2 (not illustrated in FIGS. 9A and 9B) is paired with the user terminal 1, the functional modules 3 such as the functional modules M1 and M2 can be freely attached and detached, and the state of being attached and detached is also reflected on the program creation screen. Therefore, children can also enjoy hardware design.

Herein, the input/output information in this embodiment will be supplemented. In this embodiment, by combining various types of the H-parts and various types of the S-parts, the contents of the program specified for various icons are continuously executed. With respect to the input/output information of each program, not only as simple trigger information as illustrated in FIGS. 8A to 8C but also various types of information such as analog signals can be handled as input/output information. That is, for example, with respect to the input/output information in this embodiment, the information (for example, a temperature of 15 degrees) acquired by the temperature sensor can be directly output as information such as an analog signal and used for the program creation. For this reason, even a complicated information process that cannot be realized only by digital signal information can be realized.

In addition, for example, in the above-described embodiment, the pairing of the basic core 2 with the user terminal 1 is executed by short-range wireless communication in a method conforming to the NFC (registered trademark) standard, but the present invention is not limited thereto. The pairing is not limited to the short-range wireless communication, and the pairing may be executed by any means. Moreover, in the above-described embodiment, the execution result of the program created by the user terminal 1 is transmitted by using the short-range wireless communication in a method conforming to a standard such as Bluetooth (registered trademark), but the present invention is not limited thereto. The created program is not limited to the short-range wireless communication, and the created program may be transmitted by using any means.

In addition, for example, the number of the basic cores 2 and the number of the functional modules 3 are not particularly limited to the above-described embodiments. That is, the number of the basic cores 2 and the number of the functional modules 3 may be the same as or different from each other. That is, one functional module 3 may be connected to one basic core 2.

In addition, for example, in the above-described embodiment, the transmission information is generated and transmitted by the basic core 2 and received by the functional module 3, but the present invention is not limited thereto. For example, the transmission information may be generated and transmitted by the functional module 3 and received by the basic core 2 or another functional module 3.

In addition, it is sufficient that, for example, a signal transmitted from the basic core 2 to supply power to one or more functional modules 3 is to be in a form capable of transmitting power in a form of electric current, and the signal may be a DC current or an AC current.

In addition, for example, a series of the above-described processes can be executed by hardware or can be executed by software. In other words, the functional configuration in FIG. 6 is merely an example and is not particularly limited. That is, it is sufficient that the information processing system has a function capable of executing a series of the above-described processes as a whole, and what kind of functional block is used to realize this function is not particularly limited to the example of FIG. 6. In addition, the location of the functional block is not particularly limited to FIG. 6 and may be arbitrary. In addition, one functional block may be configured by hardware alone, may be configured by software alone, or may be configured by a combination thereof.

In addition, for example, in a case where a series of processes is executed by software, a program constituting the software is installed in a computer or the like from a network or a recording medium. The computer may be a computer combined in dedicated hardware. In addition, the computer may be a computer that can execute various functions by installing various programs, for example, a general-purpose smartphone or a personal computer in addition to a server.

In addition, for example, a recording medium including such a program is not only configured with a removable medium (not illustrated) distributed separately from a device main body in order to provide the user with the program and is but also configured with a recording medium or the like provided the user in a state where the recording medium is assembled in the device main body in advance.

In addition, in this specification, a step of describing the program recorded on the recording medium includes not only processes executed in a time-serial manner according to the order but also processes executed in parallel or individually without being necessarily executed in a time-serial manner. In addition, in this specification, the term "system" denotes an entire device configured with a plurality of devices, a plurality of means, or the like.

In other words, the information processing device to which the present invention is applied can take various embodiments having the following configurations. That is, it is sufficient that the information processing device (for example, the basic core 2 in FIG. 6) to which the present invention is applied is an information processing device that executes information communication and power supply to one or more other information processing devices (for example, the functional modules 3*a* and 3*b* in FIG. 6), each exhibiting a prescribed function, the information processing device includes:

a pairing execution means (for example, the pairing unit 201 in FIG. 6) for executing pairing with a control device (for example, the user terminal 1) that executes control for causing the other information processing device to exhibit the prescribed function by short-range wireless communication of a predetermined method;

a transmission information generation means (for example, the transmission information generation unit 211 in FIG. 6) for generating transmission information including prescribed information to be used by the other information processing device to exhibit or while exhibiting the prescribed function on the basis of the control by the control device and information indicating a transmission destination among the one or more other information processing devices; and a transmission control means (for example, the connection unit 47 in FIG. 6) for superimposing the transmission information on a signal for supplying power to the one or more other information processing devices in a form of electric current and executing control for transmitting the signal to the one or more other information processing devices.

Therefore, the user can create the program by an easy operation (such as combining and connecting icons) while visually checking the contents of the program to be created. In addition, this also provides a technology capable of implementing a large number of functions with a small number of devices. In addition, this also provides a technology capable of stabilizing data communication with a simple configuration.

EXPLANATION OF REFERENCE NUMERALS

1: user terminal, 2: basic core, 3: functional module, 21: CPU, 27: display unit, 30: first short-range wireless communication unit, 31: second short-range wireless communication unit, 41: CPU, 45: first short-range wireless communication unit, 46: second short-range wireless communication unit, 47: connection unit, 48: power source unit, 51: inter-module transmission unit, 52: signal superimposition unit, 61: CPU, 67: connection unit, 68: functional hardware, 69: power extraction unit, 71: inter-module transmission unit, 72: signal separation unit, 101: pairing unit, 102: program creation unit, 103: program execution unit, 104: display control unit, 105: communication control unit, 201: pairing unit, 202: terminal communication control unit, 203: functional module communication control unit, 204: main control unit, 242: main control unit, 243: function exhibition unit, 500: program storage unit, 600: S-part DB

The invention claimed is:

1. An information processing device that executes information communication and power supply through a first and a second serial ports to one or more other information processing devices each exhibiting a prescribed function, the information processing device comprising:
   a power source unit for supplying power;
   a processor coupled to a memory, wherein the processor is configured to:
      execute pairing with a control device that executes control for causing the other information processing device to exhibit the prescribed function;
      generate transmission information including: prescribed information to be used by the other information processing device to exhibit or while exhibiting the prescribed function based on the control by the control device and information indicating a transmission destination among the one or more other information processing devices; and
      execute control for transmitting a signal to the one or more other information processing devices, the signal supplies power from the power source unit to the other one or more information processing devices via the first and second serial ports while superimposing the transmission information by power line communication,
   the information processing device further comprises
   a first short-range wireless communication unit for executing the pairing by a short-range wireless communication of a predetermined method, and
   a second short-range wireless communication unit for communicating an execution result of a program including commands included in the transmission information with the control device, through a second short-range wireless communication having a predetermined method different from the first short-range wireless communication for causing the one or more other information processing device to exhibit a prescribed function,
   wherein the first serial port is provided to supply power from the power source unit to the one or more other information processing devices by a current for superimposing the transmission information, and
   the second serial port is provided to configure a closed loop with the one or more other information processing devices connected in series from the first serial port through a power line.

2. The information processing device according to claim 1, wherein the one or more other information processing device is connected in a daisy chain type.

3. The information processing device according to claim 1, wherein two or more other information processing devices are connected in a star type.

4. The information processing device according to claim 1, wherein the one or more other information processing device is connected in a loop type.

\* \* \* \* \*